United States Patent Office 3,216,656
Patented Nov. 9, 1965

3,216,656
CONTROL DEVICES FOR CONTROLLING A CARD PUNCHING MACHINE BY MEANS OF A DATA TRANSMITTER
Karl Birger Uvelius, Malmo, and Sven Tore Wilk, Hohog, Sweden, assignors to Aktiebolaget Addo, Malmo, Sweden, a corporation of Sweden
Filed Apr. 17, 1964, Ser. No. 360,632
2 Claims. (Cl. 234—18)

The invention relates to a control device for controlling a card punching machine, capable of different types of card handling operations in response to different types of signals, by means of a data transmitter, such as a weighing machine, meter of physical conditions or particularly a calculating or bookkeeping machine, in a new and useful manner.

When such a punching machine works together with a bookkeeping machine for instance, the cards are divided into a plurality of fields for date, identifying number, charges, credits, balance etc. During most posting operations there is at least one field where no significant number is to be punched. For instance, when posting a charge no significant number is to be punched in the credits field of the card. In prior art, when a number registered in the bookkeeping machine is to be punched the operator of the machine operates a motor bar of the bookkeeping machine and when no significant number is to be punched in a field of a card the operator of the bookkeeping machine operates one special key in order to cause the punching machine to feed the card without punching so that said field is skipped. In other cases the operator presses a second special key in order to cause the punching machine to skip the card. In still other cases, the operator presses a third key in order to cause the punching machine to carry out a duplicating operation, i.e. to punch the card or a field of said card in exactly the same manner as the previous card. Thus, it is clear that the multiplicity of keys for starting different operations of the punching machine involves a tiresome and critical work for the operator so that, for instance, he does not start a field skip operation, when he should have started a punching operation.

The main object of the invention is to provide a control device for controlling a card punching machine by means of a data transmitter in such a way that the control device initiates one signal to the punching machine when the data transmitter contains all zeros and initiates another signal to the punching machine when the data transmitter contains a significant number.

Thus, the invention makes it possible for the operator of a bookkeeping machine to start all operations of the punching machine by means of one and the same motor key of the bookkeeping machine. The operation of the card punching machine will be a punching operation when the data transmitter contains a significant number but a field skip operation or a card skip operation or a duplicating operation when the data transmitter contains all zeros.

The invention is not restricted to the case chosen as an explanatory example above in which the punching machine works together with a bookkeeping machine as somewhat similar conditions are sometimes at hand when the punching machine works together with a weighing machine, a meter for physical conditions and other data transmitters.

Often there is a maximum for the number of digits that may be punched during a punching operation. For instance, a field on the card may be dimensioned to accommodate not more than three digits. In prior art the operator of the data transmitter must watch that the maximum number of digits is not exceeded or complicated circuitry must be used to prevent violation of the maximum prescribed. This is called format control. The control device according to the invention lends itself in an easy way to such format control.

Thus, a further object of the invention is to provide a control device for controlling a card punching machine by means of a data transmitter in such a way that the control device initiates one signal to the punching machine when the data transmitter contains all zeros and initiates another signal to the punching machine when the data transmitter contains a significant number containing not more than a predetermined number of digits.

These and further features of the invention will become apparent from the following description in which reference is made to the accompanying drawings in which.

*The data transmitter*

Figure 1:
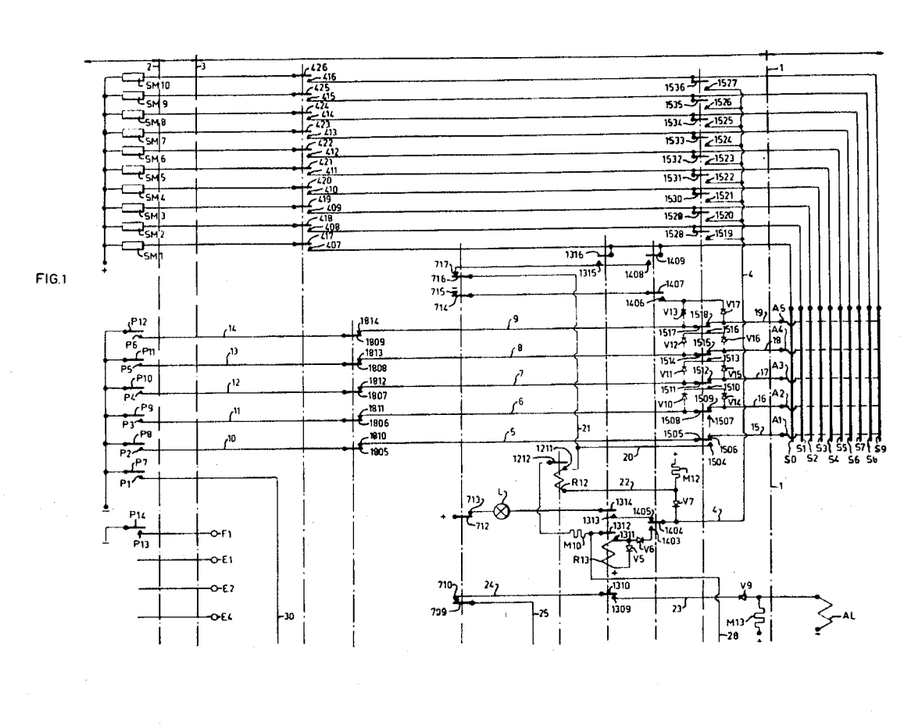
FIGS. 1 and 2 show an electric wiring diagram of a control device according to the invention as well as the interesting circuitry in a data transmitter and a card punching machine (FIG. 2 should be connected to the lower edge of FIG. 1 to form the complete wiring diagram).
Figure 2:
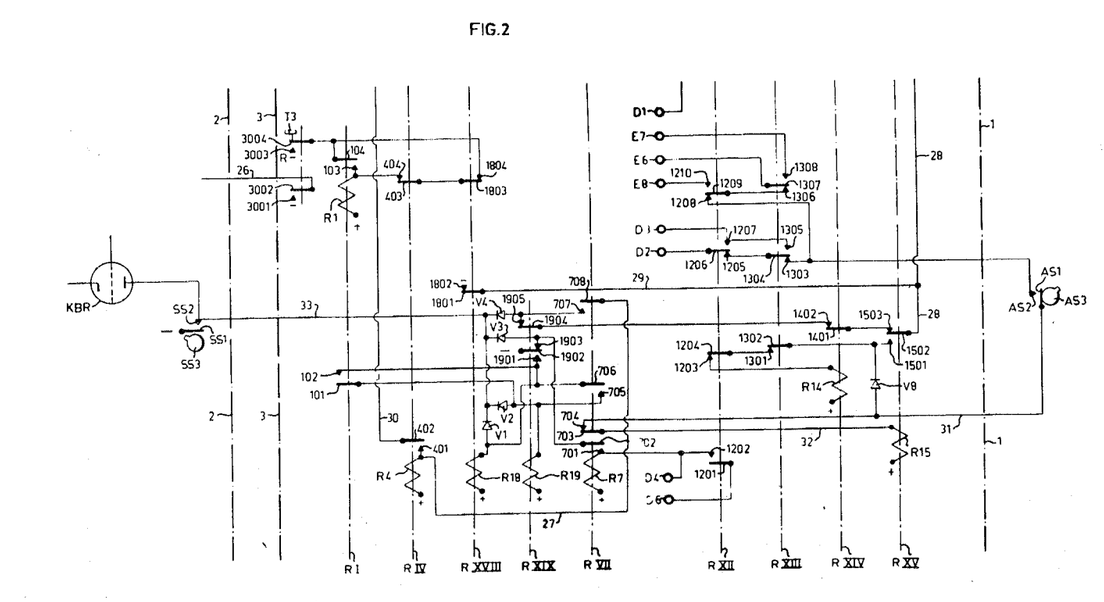

To the right of a coarse broken line 1 in the drawings there are shown certain means of a data transmitter which in the example chosen is assumed to be a calculating machine with electric feed-out of the numbers set in the machine. This data transmitter or calculating machine may be of the same design as the transmitter in U.S. Patent No. 3,139,821 (U.S. patent application Serial No. 153,935 of November 21, 1961).

For greater simplicity the accompanying drawings show but five denominal orders of the calculating machine. Each denominal order has a denominal order contact A1–A5 which are settable with the aid of the number representing means of the calculating machine into electric contact with either of ten digit lines S0–S9 for digits 0–9 to represent a digit set in the respective denominal order of the calculating machine. The denominal order contact A1 is provided in the highest denominal order of the calculating machine, the contact A2 in the next higher denominal order etc., and consequently the contact A5 is in the unit denominal order. The calculating machine is assumed to be of the type in which the denominal order contacts A1–A5 in an operating cycle of the calculating machine are set on a number entered in the calculating machine and remain in set position after the operating cycle until the machine starts a new operating cycle, as is described in the above-mentioned U.S. patent. The calculating machine can be caused to effect an operating cycle in the ordinary manner by depression of a motor key (not shown). During the latter portion of the operating cycle a cam AS3 on the main shaft of the calculating machine closes a make contact AS1, AS2 for a purpose to be stated in the following. Further, the calculating machine has a blocking magnet AL which when energized prevents the starting of a new operating cycle of the calculating machine e.g. in that it causes a pawl (not shown) to engage the motor key (not shown) to prevent depression of said key, which is prior art.

*The card punching machine*

To the left of a coarse broken line 2 in the drawings there are shown the interesting portions of a card punching machine of a known type, e.g. the type 024 machine marketed by The International Business Machines Corporation. This punching machine has ten punching magnets SM1–SM10 for digits 0–9, one terminal of said punching magnets being connectible each with one of the digit lines S0–S9 of the calculating machine while the other terminal of the punching magnets is connected to the plus pole of a current source not shown. The punching machine also has a program control mechanism (not shown) of a known type, which is adapted at each current supply to the punching magnets to be advanced one step to close the same or another selection of program switches P1–P14. The movable contacts P7–P12 and P14 of the program switches are connected to the negative pole of the current source while the fixed contacts P2–P6 of the program switches are connectible in a manner to be described in the following each to one of the denominal order contacts A1–A5 of the calculating machine. The fixed contacts P1 and P13 of the program switches are connected to means in the control device described in the following, as will appear in the course of said description. At each card discharge cycle of the punching machine this machine closes by means of a cam SS3 a make contact SS1, SS2 the movable contact arm SS1 of which is connected to the negative pole of the current source while the fixed contact SS2 is connected to the control device described in the following. In all other operating cycles of the punching machine an electronic tube KBR applies a negative pulse directly to the contact SS2.

*The control device*

The control device proper according to the invention is illustrated in the drawings between line 1 and a coarse broken line 3 and is preferably associated with the calculating machine and connected with the punching machine by means of remote control lines which extend between the broken lines 2 and 3 of the drawing.

The control device comprises a plurality of relays, viz. a correcting relay RI, a digit transmission relay RIV, a restoring relay RXVIII, a switching relay RXIX, a punch starting relay RVII, a zero relay RXII, a not-zero relay RXIII, a scanning relay RXIV and a control relay RXV. Further, the device comprises a programming panel with socket contacts D1–D4, D6, E1, E2, E4, E6–E8 and F1 which can be connected with each other in any desired way by means of lines not shown to cause the control device to control the punching machine in the contemplated manner. Finally, the device comprises a correcting key T3 and an error indicating lamp L.

The control relay RXV has nine make contacts the movable contact arms 1528–1536 of which are connected each to one of the digit lines S1–S9 for digits 1–9 and the fixed contacts 1519–1527 of which are connected to a not-zero scanning line 4. Further the relay RXV has five make-and-break contacts, one for each denominal order in the calculating machine and the punching machine. The movable contact arms 1505, 1508, 1511, 1514, 1517 of the make-and-break contacts are connected by means of lines 5–9 each to one fixed contact 1810–1814 of five break contacts in the restoring relay RXVIII. The movable contact arms 1805–1809 of these break contacts are connected through denominal order lines 10–14 each to one of the fixed contacts P2–P6 of the program switches of the punching machine. In the released state of the relay RXV the movable contacts arms 1505, 1508, 1511, 1514, 1517 engage fixed contacts 1506, 1509, 1512, 1515, 1518 which are connected through lines 15–19 each to one of the denominal order contacts A1–A5 in the calculating machine. The other fixed contacts 1504, 1507, 1510, 1513, 1516 of the make-and-break contacts are connected in somewhat different ways for the different make-and-break contacts. The contact 1504 is connected through a line 20 to a zero scanning line 21. The contact 1507 is connected to contact 1506. The contact 1510 is connected via two diodes V10 and V14 to the line 6 and 16, respectively. The contact 1513 is connected via two diodes V11 and V15 to lines 7 and 17. The contact 1516 is connected via two diodes V12 and V16 to the line 8 and 18, respectively. In addition, a fixed contact 1406 of a make contact in the scanning relay RXIV is connected via diodes V13 and V17 to the line 9 and 19, respectively. The diodes V10–V17 are current-carrying only when lines 6–9 and 16–19 are positive in relation to the fixed contact 1510, 1513, 1516 and 1406, respectively, connected to the respective line via the respective diode.

The scanning relay RXIV and the not-zero relay RXIII each have one make contact 1408, 1409 and 1315, 1316, respectively, the movable contact arm 1409, 1316 of which is connected with the digit line S0 for zero while the fixed contact 1408, 1315 is connected to the fixed contact 717 of a break contact in the punch starting relay RVII, the movable contact arm 716 of which break contact is connected to the zero scanning line 21 leading to one terminal of the operating coil R12 of the zero relay RXII, the other terminal of said coil being connected through a line 22 to one terminal of a resistor M12 the other terminal of which is connected to the positive pole of the current source (not shown). Line 22 is also connected over a diode V7 with the not-zero scanning line 4. By operation of either of the relays RXIV, RXIII the zero scanning line 21 can thus be connected in the manner appearing from the following to the negative pole of the current source by the intermediary of the digit line S0, the relay RXII being operated by current supply to the operating coil R12 via the resistor M12 unless the not-zero scanning line 4 is in connection with the negative pole of the current source, for in such a case current from the positive pole of the current source flows through the resistor M12 and the diode V7 to the line 4, the voltage drop across the resistor M12 being so high that the line 22 is not sufficiently positive to enable current supply to the operating coil R12 in a sufficient degree to operate the relay RXII.

The movable contact arm 1407 of the earlier described make contact 1406, 1407 in the scanning relay RXIV is connected to the negative pole of the current source via a break contact 714, 715 in the relay RVII. Furthermore, the scanning relay RXIV has a make-and-break contact 1403–1405, and the movable contact arm 1404 of said make-and-break contact, which is connected to the not-zero scanning line 4 and in the released state of the relay RXIV engages the fixed contact 1405, will engage upon operation of the relay RXIV the fixed contact 1403 which via a diode V6 is connected to one terminal of the operating coil R13 of the relay RXIII, the other terminal of the operating coil R13 being connected to the positive pole of the current source. When the relay RXIV is operated and the not-zero scanning line 4 is connected to the negative pole of the current source the not-zero relay RXIII will consequently be operated. When the scanning relay RXIV is operated the connection of the not-zero scanning line 4 with the negative pole of the current source always results in an operation of the not-zero relay RXIII while the connection of the zero scanning line 21 to the negative pole of the current source results in an operation of the zero relay RXII only provided the not-zero scanning line 4 is not simultaneously conected with the negative pole of the current source.

The punch starting relay RVII has a break contact 712, 713 the movable contact arm of which is connected with the positive pole of the current source while the fixed contact 713 is connected to one terminal of the signal lamp L the other terminal of which is connected to the movable contact arm 1314 of a make contact in the not-zero relay RXIII, and the fixed contact 1313 of this make contact is connected with the earlier described fixed contact 1405 in the scanning relay RXIV. When the not-zero scanning line 4 is connected with the negative pole of the current source, the not-zero relay RXIII is operated, the punch starting relay RVII is in the released state and the scanning relay RXIV is released, the lamp L will consequently be lighted.

The blocking magnet AL in the calculating machine has one terminal connected with the negative pole of the current source while the other terminal is connected with one terminal of a diode V9 and a resistor M13, the other terminal of said resistor being connected with the positive pole of the current source. If the other terminal of the diode V9 is not connected with the negative pole of the current source, a sufficiently strong current will flow through the resistor M13 and the magnet AL in order that the magnet may keep the calculating machine blocked against the starting of a new operating cycle. Should, on the other hand, the other terminal of the diode V9 be connected with the negative pole of the current source the voltage drop across the resistor M13 will be so large that the magnet AL cannot act in a blocking manner. For the connection of the other terminal of the diode V9 with the negative pole of the current source there is provided a disabling circuit which in closed condition makes it impossible for the magnet AL to block the calculating machine. This disabling circuit includes—in addition to the resistor M13 and the diode V9—a line 23 by means of which the said other terminal of the diode is connected with the fixed contact 1309 of a break contact in the not-zero relay RXIII, and the movable contact arm 1310 of said break contact is connected through a line 24 with the fixed contact 710 of a break contact provided in the punch starting relay RVII and the movable contact arm 709 of which is connected through a line 25 with the contact socket D1 in the programming panel, and in the example chosen the contact socket D1 always is connected with the contact socket F1 of the programming panel, which socket is connected with the fixed contact P13 in the program control mechanism of the punching machine. At the bginning of an operating cycle the make contact P13, P14 in the punching machine is always closed so that the blocking magnet AL consequently is inactive and the calculating machine can thus be started for initiating an operating cycle.

The socket contacts D2, D3 and E6–E8 of the programming panel are connected in the manner appearing from the drawing with four make-and-break contacts 1205–1207, 1208–1210, 1303–1305 and 1306–1308 in the zero relay RXII and the not-zero relay RXIII, and connected with this group of make-and-break contacts also is the fixed contact AS2 in the calculating machine. In the example chosen the contact socket E6 is always connected with the negative pole of the current source. In the zero control described in the following the contact socket E8 is connected with the contact socket E1 or E2 or E4 in dependence on the desired punching machine operation when no digits differing from zero have been set in the calculating machine. The contact socket E8 is connected with the contact socket E1 when it is desired that the punching machine shall advance the card occupying the punching position to another punching field in the event that no digits differing from zero have been set in the calculating machine. The contact socket E8 is connected with the contact socket E2 when it is desired to skip the punched card located in the punching position when no digits differing from zero have been set in the calculating machine. The contact socket E8 is connected with contact socket E4 when it is desired that the punching machine shall punch the punched card located in punching position in exactly the same manner as the next preceding punched card, i.e. effect a duplication. By such a connection of the programming panel it is thus possible to initiate either of the three punching machine operations merely by pressing the motor key of the calculating machine without having any numbers entered in the calculating machine. These three operations in the punching machine, that is advancing the punched card to a new field, skipping the card or duplicating it, are effected in a manner known and therefore not described in detail through the connection of the contact socket E8 with the negative pole of the current source across the make-and-break contacts 1208–1210 and 1306–1308 in the manner indicated hereinafter. The contact sockets D4 and D6 of the programming panel are connected with the fixed contact 1202 and the movable contact arm 1201, respectively, of a make contact in the zero relay RXII. In the example chosen the contact socket E7 can be connected with either the contact socket D4 or the contact socket D6 in dependence on the desired operation of the punching machine. If the contact socket E7 is connected with contact socket D4 any number differing from zero and set up in the calculating machine is punched at the initiation of an operating cycle of the calculating machine by depression of the motor key because a circuit is closed from the positive pole of the current source through the operating coil R7 of the punch starting relay RVII, the contact socket D4, the contact socket E7, the contact means 1308 and 1307 in the not-zero relay RXIII operated and to the contact socket E6 permanently connected with the negative pole of the current source. If, on the other hand, the contact socket E7 is connected with the contact socket D6 the punch starting relay RVII is operated at the initiation of an operating cycle of the calculating machine only if the zero relay RXII is in the operated state. As will be described in the following the zero relay RXII is operated in such a situation only in case a number set up in the calculating machine contains at most a given number of significative denominal orders whose number is determined by the program control mechanism in the punching machine as will be described in the following. If the number set up in the calculating machine has a greater number of significative denominal orders than that determined by the program control mechanism of the punching machine, the error indicating lamp L is instead lighted, as will be described in the following. There is thus obtained a so-called format control when the contact socket E7 is connected with the contact socket D6.

When the signal lamp L has been lighted, that is when the number set up in the calculating machine has the wrong format a correction may be effected by depression of the correcting key T3. This key actuates simultaneously two movable contact arms 3002 and 3004 of two make contacts the fixed contacts 3001 and 3003 of which are connected with the negative pole of the current source. The movable contact arm 3002 is connected through a line 26 with a prior-art mechanism in the punching machine, said mechanism discharging, when the make contact 3001, 3002 is closed, the card occupying punching position. The movable contact arm 3004 is connected with a fixed contact 1804 of a break contact provided in the restoring relay RXVIII and the movable contact arm 1803 of which is connected with the movable contact arm 403 of a break contact provided in the digit transmitting relay RIV and the fixed contact 404 of which is connected with one terminal of the operating coil R1 of the correcting relay RI, the other terminal of said coil being connected with the positive pole of the current source. At the operation of the relay RI by depression of the key T3 the relay will be kept excited over a holding make contact 103, 104 the movable contact arm 104 of which is connected with the movable contact arm 3004 operated by the key so that the relay RI is kept operated as long as the key T3 is being depressed.

The digit transmitting relay RIV has an operating coil R4 one terminal of which is connected with the positive pole of the current source and the other terminal of which is connectible with the negative pole of the current source through a line 27, a make contact 707, 708 in the punch starting relay RVII, a break contact 1904, 1905 in the switching relay RXIX, a break contact 1401, 1402 in the scanning relay RXIV, a make-and-break contact 1501–1503 in the control relay RXV, a line 28, a line 29 and a break contact 1801, 1802 in the restoring relay RXVIII. After operation the relay RIV can be kept excited via a make contact 401, 402 in the relay RIV, a line 30 and the program switch P1, P7 in the punching machine. The digit transmitting relay RIV finally has ten make contacts 407–426 the movable contact arms 417–426 of which are connected each with one of the punching magnets SM1–SM10 while the fixed contacts 407–416 are connected each with one of the digit lines S0–S9.

In the initial position of the control device the fixed contact AS2 of the calculating machine is connected with the negative pole of the current source over the make-and-break contacts 1208–1210 and 1306–1308 in the relays RXII and RXIII and the contact socket E6. When the make contact AS1, AS2 is closed during the latter part of the operating cycle of the calculating machine the operating coil R15 of the control relay RXV is supplied with current through a line 31 connected with the movable contact arm AS1, a break contact 703, 704 in the punch starting relay RVII and a line 32 to one terminal of the coil R15 because the other terminal of the coil is connected with the positive pole of the current source. After operation of the control relay RXV this relay is kept energized—although the make contact AS1, AS2 of the calculating machine is opened in that the line 31 is connected via a diode V8 with the fixed contact 1501 of the make-and-break contact in the rlay RXV and the movable contact arm 1502 of said make-and-break contact is connected with the line 28 and the line 29 which in the released state of the relay RXVIII is connected with the negative pole of the current source through the break contact 1801, 1802 in the relay RXVIII. At the operation of the relay RXV the scanning relay RXIV is also operated because the said fixed contact 1501 is connected through the break contact 1301, 1302 and 1203, 1204 in the momentarily released relays RXIII and RXII, respectively, with one terminal of the operating coil R14 of the relay RXIV, the other terminal of which coil is connected with the positive pole of the current source.

The line 28 which is connected with the negative pole of the current source via break contact 1801, 1802 in the restoring relay RXVIII and the line 29, is also connected with a make contact 1311, 1312 in the not-zero relay relay RXIII for keeping said relay energized, and the line 28 is also connected via a resistor M10 to a make contact 1211, 1212 in the zero relay RXII for keeping said relay energized.

In addition to the earlier described contacts the punch starting relay RVII has a holding make contact 701, 702 which is connected with the operating coil R7 and also with a fixed contact 1903 of a make-and-break contact provided in the relay RXIX and the movable contact arm 1902 of which is connected with the negative pole of the current source and in the released state of the relay RXIX engages the fixed contact 1903. Finally the punch starting relay also has a make contact 705, 706 the two contact means of which are connected with one terminal of the operating coil R18 and R19, respectively, of the relay RXVIII and RXIX, respectively, while the other terminals of said coils are connected with the positive pole of the current source. The movable contact arm 706 besides is connected with the fixed contact 1901 in the make-and-break contact 1901–1903 of the switching relay RXIX and with the fixed contact 102 of a make contact provided in the correcting relay RI, the movable contact arm 101 of which make contact is connected with one terminal of the operating coil R19.

The fixed contact SS2 in the punching machine finally via a line 33 is connected with one terminal of four diodes V1–V4 the other terminals of which are connected with the operating coil R18, the operating coil R19, the movable contact arm 702 and the fixed relay contacts 707 and 1905, respectively.

*Mode of operation*

The mode of operation of the device described in the foregoing will now be illustrated with the aid of tables. The heading of each table indicates the task and the connections necessary therefor between the contact sockets of the programming panel. To the left in each table is drawn a sequence diagram which is in the form of a time line which begins at the top and in certain cases branches when several different relay operations take place simultaneously or in parallel. The operation of a relay, the closure of a make contact, the lighting of the error signal lamp and the depression of the correcting key are marked on the time line by "×" while the release of a relay, the opening of a make contact, the extinction of the error signal lamp and the release of the correcting key are marked by "—," and the reference numeral of the respective means in question is indicated beside the sign "×" and "—," respectively. Moreover, the delayed release of the scanning relay RXIV is indicated by "FF." In the central column of the tables the operation current path or paths which are closed or opened in the different cases are listed by the indication of the reference numerals of the relay contacts etc. included in the current path or paths. In the right column of the tables the possibly established holding current paths for the relays are indicated in a corresponding manner.

*I Zero control (zeroes only)*

This task serves to make it possible for the operator only by depression of the motor key of the calculating machine without having earlier entered in the calculating machine a number differing from zero to cause the punching machine to move the punched card occupying punching position to another punching field (contact socket E1), to skip the punched card occupying punching position (contact socket E2), or to punch the punched card occupying punching position in the same way as the next preceding punched card (contact socket E4).

*I Zero control (zeroes only)*

E6 connected to the negative pole of the current source. E8 connected to E1 or E2 or E4. D1 connected to F1; P13, P14 being closed during the zero control so that AL does not block the data transmitter

| Schedule of operation | Operation current path | Holding current path |
|---|---|---|
| × AS1–AS2<br>\|<br>× R15<br>\| | — E6, 1307, 1306, 1209, 1208, AS2, AS1, 704, 703, R15+<br>— 1802, 1801, 1502, 1501, 1302, 1301, 1204, 1203, R14+ | — 1802, 1801, 1502, 1501, V8, 704, 703, R15+ |

I *Zero control (zeroes only)*—Continued

| Schedule of operation | Operation current path | Holding current path |
|---|---|---|
| × R14<br><br>× R14<br>× R12<br><br>×<br>Start of punching machine over E1 or E2 or E4  F F<br>— R14<br><br>× KBR-SS2<br>× R18<br>R15 —   — R12<br>— KBR-SS2<br>— R18 | — 715, 714, 1407, 1406,<br>⎡V17, A5,<br>⎣V13, 1517, 1516, ⎡V16, A4,<br>⎣V12, 1514, 1513, ⎡<br>⎡V15, A3,<br>⎣V11, 1511, 1510, ⎡V14, A2,<br>⎣V10, 1508, 1507, A1<br>S0, 1409, 1408, 717, 716, R12, M12+<br><br>⎡— E6, 1307, 1306, 1209, 1210,<br>⎢  E8, ⎡E1 or⎤ +;<br>⎢     ⎢E2 or⎥<br>⎢     ⎣E4   ⎦<br>⎣— 1802, 1801, 1502, 1501, 1302, 1301, 1204, opened when R12, 1203, R14+ are operated<br><br>— KBR-pulse, SS2, V1, R18+<br><br>— 1802, opening of holding circuits upon operation of R18,<br>1801, ⎡1502, 1501, V8, 704, 703, R15+<br>     ⎣M10, 1212, 1211, R12+<br>— KBR-pulse finished, SS2, V1, R18+ | — 1802, 1801, M10, 1212, 1211, R12, M12+ |

Upon depression of the motor key the calculating machine performs an operating cycle and during the latter portion of this cycle the make contacts AS1, AS2 is closed, the control relay RXV being operated. The relay RXV thus connects all digit lines S1–S9 for the digits differing from zero to the not-zero scanning line 4 and couples all denominal order contacts A1–A5 to the fixed relay contact 1406, and the control relay also produces operation of the scanning relay RXIV. The scanning relay thus connects all denominal order contacts A1–A5 to the negative pole of the current source, couples the operating coil R12 of the zero relay RXII to the digit line S0 for zero and couples the not-zero scanning line 4 to the operating coil R13 of the not-zero relay RXIII. If all denominal order contacts A1–A5 are in connection with the digit line S0 for zero, as was presupposed, the contact socket E1, E2 and E4, respectively, is connected with the negative pole of the current source so that the punching machine effects the desired operation. After operation of the zero relay RXII the scanning relay RXIV is released with delay. At the end of the operation of the punching machine said machine transmits a receipt pulse to the control device by means of the electronic tube KBR and the contact SS2, the restoring relay RXVIII being operated so that the control relay RXV and the zero relay RXII are released. At the end of the receipt pulse the restoring relay RXVIII is also released, whereupon the parts occupy initial position.

II *Zero control (at least one digit other than zero)*

In this task the operator by depressing the motor key of the calculating machine can cause the punching machine to punch a number entered in the calculating machine irrespective of the size of said number.

II *Zero control (at least one digit other than zero)*

E6 connected to the negative pole of the current source. E7 connected to D4. D1 connected to F1; P13, P1 are thus closed during the zero control

| Schedule of operation | Operation current path | Holding current path |
|---|---|---|
| × AS1–AS2<br>× R15<br>× R14<br><br><br><br><br><br>× R14<br>× R13<br><br><br>AL ×   × R7<br>    F F<br>    Punching according to VI<br>— R14 | ⎤ — Equal to task I<br>⎦<br><br>— 715, 714, 1407, 1406,<br>⎡V17, A5,<br>⎣V13, 1517, 1516, ⎡V16, A4,<br>⎣V12, 1514, 1513, ⎡<br>⎡V15, A3,<br>⎣V11, 1511, 1510, ⎡V14, A2,<br>⎣V10, 1508, 1507, A1,<br>One or more of S1–S9, one or more of 1528–1536, one or more of 1519–1527, 1404, 1403, V6, R13+<br>(According to I, R12 is not operated at the occurrence of zeroes; cf. the specification)<br><br>⎡— E6, 1307, 1308, E7, D4, R7+<br>⎢<br>⎢— P14, P13, F1, D1, 709, 710, 1310, opening of disabling circuit for AL upon operation of R13, 1309, V9; +M13, AL—<br>⎢<br>⎣— 1802, 1801, 1502, 1501, 1302, opening upon operation of R13, 1301, 1204, 1203, R14+ | — 1802, 1801, 1312, 1311, R13+ |

Upon depression of the motor key the cycle starts in the same way as in task I with the make contact AS1, AS2 being closed and the control relay RXV and the scanning relay RXIV being operated. As it is presupposed that at least one digit other than zero is entered in the calculating machine the not-zero scanning line 4 will be connected to the negative pole of the current source over at least one of the make contacts 1519–1536 of the control relay RXV, the digit line or lines S1–S9 for the digits differing from zero, which lines are connected to at least one of those denominal order contacts A1–A5 which have been moved from zero position, the make contact 1406, 1407 in the scanning relay RXIV operated and the break contact 1714, 1715 in the momentarily released punch starting relay RVII. As a consequence, the not-zero relay RXIII is operated via the not-zero scanning line 4 and the contacts 1403, 1404 in the scanning relay RXIV. Upon operation of the scanning relay RXIV the zero scanning line 21 has also been connected to the digit line S0 for zero. If any of the denominal order contacts A1–A5 is in connection with the digit line S0 this nevertheless does not produce any operation of the zero relay RXII since the not-zero scanning line 4 is supposed to be connected with the negative pole of the current source so that the voltage drop across the resistor M12 in the earlier described manner is too large to permit operation of the zero relay RXII. Under the given circumstances therefore the not-zero relay RXIII alone is operated.

Upon operation of the relay RXIII the connection of the diode V9 with the negative pole of the current source over contact socket D1 and the closed program control make contact P13, P14 is opened so that the blocking magnet AL is made operative and prevents the initiation of a new operating cycle in the calculating machine until the punching machine has punched the number entered in the calculating machine. Upon operation of the relay RXIII the punch starting relay RVII is also operated so that punching is performed in the manner described in the following. The operation of the relay RXIII finally also results in that the scanning relay RXIV is released with delay. If in this task the contact socket E8 were also connected to any of the contact sockets E1, E2, E4 on the programming panel according to task I the operator by depressing the motor key can produce either a punching of a number entered in the calculating machine and differing from zero according to task II, or produce any of the punching machine operations according to task I.

III Format control (correct number of digits)

This task corresponds to task II except that the punching of the number entered in the calculating machine is to take place only in case the number entered in the calculating machine contains at most a certain number of significative denominal orders, in the example here chosen three denominal orders. This format of three denominal orders is determined by the punching machine in that it keeps the program switches P4, P10 of the third denominal order closed at the start of the operating cycle.

III Format control (correct number of digits)

E6 connected to the negative pole of the current source. E7 connected to D6. D1 connected to F1; P13, P14 are closed during the format control. By way of example the format is assumed to comprise at most three digits so that P4, P10 are closed at the format control

| Schedule of operation | Operation current path | Holding current path |
|---|---|---|
| × AS1–AS2<br>× R15<br>× R14<br>× R13 | ]—Equal to task II<br><br>— P14, P13, F1, D1, 709, 710, 1310, opening of the disabling circuit for AL upon operation of R13, 1309, V9; +M13, AL−;<br>— 1802, 1801, 1502, 1501, 1302, opening at the operation of R13, 1301, 1204, 1203, R14+; | |
| AL ×  FF<br>— R14<br><br>× R12<br>× R7<br>Punching according to task VI | — P10, P4, 1807, 1812, 1511, 1510, V14, A2 V10, 1508, 1507, A1<br>S0, 1316, 1315, 717, 716, R12, M12+<br>— E6, 1307, 1308, E7, D6, 1201, 1202, R7+ | — 1802, 1801, M10, 1212, 1211, R12, M12+ |

When the operator depresses the motor key the operating cycle starts in the same way as in task II by the closure of the make contact AS1, AS2, the operation of the control relay RXV, the operation of the scanning relay RXIV, and the operation of the not-zero relay RXIII (since digits differing from zero have been entered in the calculating machine). Same as in task II the operation of the not-zero relay RXIII results in that the blocking magnet is made active and the scanning relay RXIV is released with delay, but the operation of the relay RXIII does not result in immediate operation of the punch starting relay RVII since the contact socket E7 is now connected to the contact socket D6 instead of D4 as in task II. When the scanning relay RXIV is released the connection of the denominal order contacts A1–A5 with the negative pole of the current source over the make contact 1406, 1407 of the scanning relay and the break contact 714, 715 of the punch starting relay is opened so that thereafter only the denominal order contacts A1, A2 are connected to the negative pole of the current source over the program switch P4, P10. At the release of the scanning relay RXIV the make contact 1408, 1409 is opened but the digit line S0 for zero is nevertheless kept connected with the zero scanning line 21 by the make contact 1315, 1316 of the operated not-zero relay RXIII. The not-zero scanning line 4 is still connected with the digit lines S1–S9 for the digits differing from zero over the make contacts 1519–1536 of the operated control relay RXV.

As it is presupposed here that the format is correct, that is, no digit differing from zero is entered in the two highest denominal orders of the calculating machine so that the denominal order contacts A1 and A2 are in connection with the digit line S0 for zero the zero relay RXII will now be operated because the denominal order contacts A1 and A2 are connected to the negative pole of the current source whereas the denominal order contacts A3–A5, at least some of which is engaged with a digit line S1–S9 for a digit differing from zero, have lost their connection with the negative pole of the current source owing to the release of the scanning relay RXIV so that the not-zero scanning line is not any more connected to the negative pole of the current source, which is a prerequisite for operation of the relay RXII.

When the zero relay RXII is operated the punch starting relay RVII will also be operated because of the closure of the make contact 1201, 1202 in the relay RXII. After that punching of the number entered in the calculating machine is performed in the manner described in the following.

Same as in regard of task II it is possible at a format control according to task III simultaneously to have the contact socket E8 of the programming panel connected to the contact socket E1 or E2 or E4 for performing task I when no digits differing from zero have been entered in the calculating machine.

IV *Format control (too many digits)*

This task serves to show what happens if there are too many significant denominal orders in the calculating machine at the format control. The connection on the programming panel in the control device agrees with that of task III, and it is also presupposed that the punching machine has determined the format to not more than three denominal orders. It is now presupposed that a digit differing from zero has been entered in at least one of the two highest denominal orders of the calculating machine so that the denominal order contact A1 and/or A2 is in connection with some of the digit lines S1–S9 for the digits differing from zero.

The first part of the operating cycle up to the making operative of the blocking magnet AL and the release of the scanning relay RXIV inclusive corresponds to the first part of task III. As it is assumed that the denominal order contact A1 and/or A2, which is now in connection with the negative pole of the current source over the closed program switch P4, P10, is in connection with some of digit lines S1–S9 for the digits differing from zero, the zero relay R12 will not be released at the release of the scanning relay RXIV as was described in task III, since the not-zero scanning line 4 is connected to the denominal order contact A1 and/or A2 and thus to the negative pole of the current source through some of the digit lines S1–S9 for the digits differing from zero. Instead of an operation of the zero relay RXII when the scanning relay RXIV is released, the error signal lamp L will be lighted, which lamp is connected with the poles of the current source over the closed break contact 712, 713 in the punch starting relay RVII which now occupies the released state, the closed make contact 1313, 1314 of the operated not-zero relay RXIII and the relay contacts 1404, 1405 in the disconnected scanning relay RXIV and the not-zero scanning line 4.

The calculating machine is blocked by means of the blocking magnet AL, and the operator cannot effect any new operation with the calculating machine until he has corrected the error state signaled by the lamp L.

V *Correction*

The operator can correct the error state arisen through task IV by depressing the correcting key T3.

IV *Format control (too many digits)*

E6 connected to the negative pole of the current source. E7 connected to D6. D1 connected to F1; P13, P14 are closed during the format control. By way of example it is assumed that the format is not more than three digits so that P4, P10 are closed at the format control V—*Correction*

The initial state is the final state according to task IV

V—*Correction*—Continued

| Schedule of operation | Operation current path | Holding current path |
|---|---|---|
| R18 ✕  ✕ R19<br><br>R15 ⌐ R13 ⌐<br><br><br><br><br>AL ⌐  L ⌐ | — 1802, opening at the operation of R18, 1801, ⌐1312, 1311, R13+ 1502, 1501, V8,<br>  └704, 703, R15+<br><br>⌐ — P14, P13, F1, D1, 709, 710, 1310, closing of disabling circuit for AL at the release of R13, 1309, V9, M13+;<br>— P10, P4, 1807, 1812, 1511<br>  1510 ⌐V14, A2      one<br>       └V10, 1508, 1507, A1<br>  or two of S1–S9, one or two of 1528–1536, one or two of 1519–1527, 1404, 1405, 1313, opening at the release of R13, 1314, L, 713, 712+; | — 1902, 1901, R18+<br>— 1902, 1901, 102, 101, R19+ |
| ✕ R19 | | |
| — SS1–SS2 | | |
| — T3 | — 3003, opened at the release of T3, 3004, 104, 103, R1+ | |
| — R1 | — 1902, 1901, 102, opening at the release of R1, 101, R19+ | |
| — R19 | — 1902, opening at the release of R19, 1901, R18+ | |
| — R18 | | |

Upon depression of the correcting key T3 the line 26 is connected to the negative pole of the current source over the key operated make contact 3001, 3002 so that the punch card occupying punching position is discharged. Upon depression of the key T3 the correcting relay RI is also closed to prepare a holding circuit for the switching relay RXIX. When the punching machine performs the discharge it sends a receipt pulse to the control device by closing of the make contact SS1, SS2, and the relays RXVIII and RXIX are thereby operated with holding. At the operation of the restoring relay RXVIII the connection of the lines 28 and 29 with the negative pole of the current source is broken by opening of the break contact 1801, 1802 in the restoring relay RXVIII so that the relays RXIII and RXV are released. The release of the relay RXIII also results in the extinction of the lamp L and the disabling of the blocking magnet AL. When the receipt pulse from the punching machine has ceased and the key T3 is released by the operator, the correcting relay RI is released whereby the switching relay RXIX is released and in turn releases the restoring relay RXVIII whereupon the parts again occupy the initial position.

VI *Punching after task II and/or III*

The above description of tasks II and III was concluded by the operation of the punch starting relay RVII, which upon operation results in the punching of a number entered in the calculating machine. This punching is effected in the manner appearing from the table below, it being assumed that three digits are to be punched.

VI *Punching after task II and/or task III*

It is assumed by way of example that three digits are to be punched. P4, P10 are closed during the first punching cycle, P5, P11 during the second and P6, P12 during the third cycle while P1, P7 are closed during the second and third punching cycles

| Schedule of operation | Operation current path | Holding current path |
|---|---|---|
| ✕ R7 | — 1802, 1801, 1502, 1501, V8, 704, opening at the operation of R7, 703, R15+ | — 1902, 1903, 702, 701, R7+ |
| — R15 | — 1802, 1801, 1502, 1503, 1401, 1402, 1904, 1905, 707, 708, R4+ | |
| ✕ R4 | — P10, P4, 1807, 1812, 1511, 1512, A3, any of S0–S9, any of 407–416, any of 417–426, any of SM1–SM10+ | |
| ✕ KBR–SS2 | — KBR-pulse, SS2, ⌐ V1, R18+<br>                    └ V2, R19+ | |
| R18 ✕  ✕ R19 | ⌐ — 1802, opening at the operation of R18, 1801 ⌐<br>  ⌐1312, 1311, R13+; └<br>  └M10, 1212, 1211, R12, M12+;<br>— P10, P4, 1807, opening at the operation of R18, 1812, 1511, 1512, A3, any of S0–S9, any of 407–416, any of 417–426, any of SM1–SM10+; | — 1902, 1901 ⌐ R18+<br>               └ 706, 705, R19+<br><br>Holding of R7 changes from<br>— 1902, opening at the operation of R19, 1903, 702, 701, R7+ to<br>— KBR-pulse, SS2, V3, 702, 701, R7+ |
| SM1–SM10 ⌐ R12 ⌐ R13— — P13–P14 | Keeps the disabling circuit for AL broken in spite of R7 being later released | Despite the operation of R18 operating coil R4 is held by KBR-pulse: KBR-pulse, SS2, V4, 707, 708, R4+ |

VI  Punching after task II and/or task III—Continued

| Schedule of operation | | Operation current path | Holding current path |
|---|---|---|---|
| — P13–P14 | | | |
| × P1–P7 | | | — P7, P1, 402, 401, R4+ |
| | — KBR-SS2 | — KBR-pulse finished, SS2, V3, 702, 701, R7+ | |
| | — R7 | — 1902, 1901, 706, opening, 705, R19+ | |
| | — R19 | — 1902, opening, 1901, R18+ | |
| | — R18 | — P11, P5, 1808, 1813, 1514, 1515, A4, any of S0–S9, any of 407–416, any of 417–426, any of SM1–SM10+ | |
| | × KBR-SS2 | — KBR-pulse, SS2, ⎡V1, R18+<br>⎣V2, R19+ | |
| R18 ×    × R19<br>SM1–SM10 — | | — P11, P5, 1808, opening at the release of R18, 1813, 1514, 1515, A4, any of S0–S9, any of 407–416, any of 417–426, any of SM1–SM10+ | — 1902, 1901, R18+ |
| | — KBR-SS2 | — KBR-pulse finished, SS2, V2, R19+ | |
| | — R19 | — 1902, opening, 1901, R18+ | |
| | — R19 | | |
| | — R18 | — P12, P6, 1809, 1814, 1517, 1518, A5, any of S0–S9, any of 407–416, any of 417–426, any of SM1–SM10+ | |
| | × KBR-SS2 | — KBR-pulse, SS2, ⎡V1, R18+<br>⎣V2, R19+ | |
| R18 ×    × R19<br>SM1–SM10 — | | — P12, P6, 1809, opening at the operation of R18, 1814, 1517, 1518, A5, any of S0–S9, any of 407–416, any of 417–426, any of SM1–SM10+ | — 1902, 1901, R18+ |
| P1, P7 —<br>R4 — | | — P7, opening, P1, 402, 401, R4+ | |
| | — KBR-SS2 | — KBR-pulse finished, SS2, V2, R19+ | |
| | — R19 | — 1902, opening, 1901, R18+ | |
| | — R18 | | |
| | × P13–P14 | — P14, P13, F1, D1, 709, 710, 1310, 1309, V9, M13+ | |
| | — AL | | |

When the punch starting relay RVII is operated the control relay RXV is released so that the not-zero scanning line 4 is separated from the digit lines S1–S9 for the digits differing from zero, and the denominal order lines 10–14 are connected with the denominal order contacts A1–A5 of the respective associated denominal order. The not-zero relay RXIII is operated, it is true, but the digit line S0 for zero is nevertheless separated from the zero scanning line 21 by the interruption of the break contact 716, 717 of the punch starting relay RVII. At the release of the control relay RXV the digit transferring relay RIV is operated so that the punching magnets SM1–SM10 are connected to the digit lines S0–S9. This will make one of the punching magnets operative, the circuit of which is closed through the denominal order contact A3 and the program switch P4, P10.

At the punching of this first digit the punching machine delivers a receipt pulse by the electronic tube KBR to the contact SS2 whereby the restoring relay RXVIII and the switching relay RXIX are operated. At the operation of the relay RXVIII the connection between the denominal order lines 10–14 and the denominal order contacts A1–A5 is interrupted so that the punching magnet which was made operative is made inoperative. The relays RXII and RXIII hitherto operated are also released. The program control mechanism in the punching machine is advanced one step, the program switch P4, P10 being opened and the program switch P5, P11 being instead closed, and in addition the make contact P1, P7 on one hand is closed for holding the digit transferring relay RIV, and the make contact P13, P14 on the other hand is opened in order that the blocking magnet AL may be held operative in spite of the punch starting relay RVII being released later.

When the receipt pulse from the punching machine ceases the punch starting relay RVII is released, which results in the switching relay RXIX being released, and this will in turn release the restoring relay RXVIII. At the release of the relay RXVIII the denominal order lines 10–14 are again connected to the denominal order contacts A1–A5 so that some of the punching magnets SM1–SM10 is made operative by connection to the negative pole of the current source through the denominal order contact A4 and the program switch P5, P11.

After that a new receipt pulse will be obtained from the punching machine so that the relays RXVIII and RXIX are again operated. This will make the punching magnet inoperative, which was active during this punching cycle. The program control mecahnism of the punching machine opens the program switch P5, P11 and instead closes the program switch P6, P12. When the receipt pulse through SS2 ceases the relay RXIX is first released and then the relay RXVIII, whereby some of the punching magnets SM1–SM10 is made operative by connection with the negative pole of the current source through the denominal order contact A5 and the program switch P6, P12. A new receipt pulse will be obtained from the punching machine through SS2 so that the relays RXVIII and RXIX are again operated and the punching magnet is made inoperative which was active during the punching cycle. The program control mechanism in the punching machine opens the program switch P6, P12 and the program switch P1, P7 which was closed during the second and third punching cycles. The opening of the program switch P1, P7 will release the digit transferring relay RIV so that the punching magnets SM1-SM10 are separated from the digit lines S0-S9. When the receipt pulse through SS2 ceases the relays RXIX and RXVIII are released. The program switch P13, P14 is closed through the program control mechanism in the punching machine and this results in the blocking magnet AL in the calculating machine being made inoperative. The parts have thus returned to the initial position so that the operator can start a new performance by releasing an operating cycle of the calculating machine.

What we claim and desire to secure by Letters Patent is:

1. A control device for controlling a card punching machine, capable of different types of card handling operations in response to different types of signals, by means of a data transmitter, comprising a plurality of digit lines individually assigned for zero and digits differing from zero, denominal order contacts in the data transmitter each settable into electric contact with either of said digit lines to represent a digit of a number set in the data transmitter, a control relay, an operating switch closed during an operating cycle of the data transmitter for energizing said control relay, a scanning relay, first contact means of said control relay for energizing said scanning relay when said control relay is energized, a first power source pole and a second power source pole, a zero relay, an operating coil of said zero relay, a first terminal and a second terminal of said zero relay operating coil, a resistor for connecting said second terminal of said zero relay operating coil to said second pole, a not-zero relay, an operating coil of said not-zero relay, a first terminal and a second terminal of said not-zero relay operating coil, said second terminal of said not-zero relay operating coil being connected to said second pole, first contact means of said scanning relay for connecting said denominal order contacts to said first pole when said scanning relay is energized, second contact means of said scanning relay for connecting said digit line for zero to said first terminal of said zero relay operating coil, a not-zero scanning line, second contact means of said control relay for connecting said digit lines for the digits differing from zero to said not-zero scanning line, when said control relay is energized, a diode connecting said not-zero scanning line to said second terminal of said zero relay operating coil and being adapted to be current carrying only when said not-zero scanning line is connected to said first pole, third contact means of said scanning relay connecting said not-zero scanning line to said first terminal of said not-zero relay operating coil when said scanning relay is energized, contact means of said zero relay and said not-zero relay for initiating one signal to the punching machine when said zero relay is operated, and a different signal to the punching machine when said not-zero relay is operated.

2. A control device according to claim 1, comprising denominal order lines connected to said denominal order contacts, means connecting, at the beginning of an operating cycle of the data transmitter, said first power source pole to the denominal order line of the highest denominal order which is to contain a significant digit, third contact means of said control relay adapted when said control relay is energized to switch over said denominal order lines except that of the highest denominal order from the denominal order contact of the respective associated denominal order in the data transmitter to the denominal order contact of the next higher denominal order and to switch over the denominal order line of the highest denominal order from the denominal order contact of the highest denominal order directly to said first terminal of said zero relay operating coil, break contact means of said not-zero relay for releasing said scanning relay when said not-zero relay is energized, first make contact means of said not-zero relay for connecting said digit line for zero to said first terminal of said zero relay when said not-zero relay is energized, an error indicating device, second make contact means of said not-zero relay and break contact means of said scanning relay for connecting said not-zero scanning line to said error indicating device when said not-zero relay is energized and said scanning relay is released, and make contact means of said zero relay for initiating a punching operation of the punching machine when said zero relay is energized while said not-zero relay is energized.

References Cited by the Examiner

UNITED STATES PATENTS

| | | | |
|---|---|---|---|
| 2,366,861 | 1/45 | Lake et al. | 234—24 |
| 2,858,888 | 11/58 | McGayhey et al. | 234—24 |
| 3,101,894 | 8/63 | Smith | 239—24 |

WILLIAM W. DYER, Jr., *Primary Examiner.*

WILLIAM S. LAWSON, *Examiner.*